J. C. LEHMANN.
DOOR CHECK.
APPLICATION FILED DEC. 6, 1916.
1,254,245.
Patented Jan. 22, 1918.
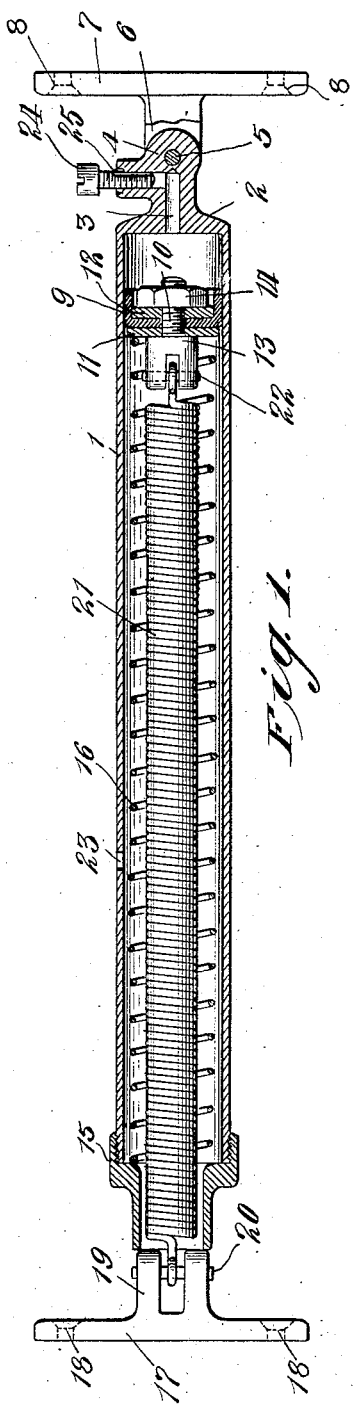
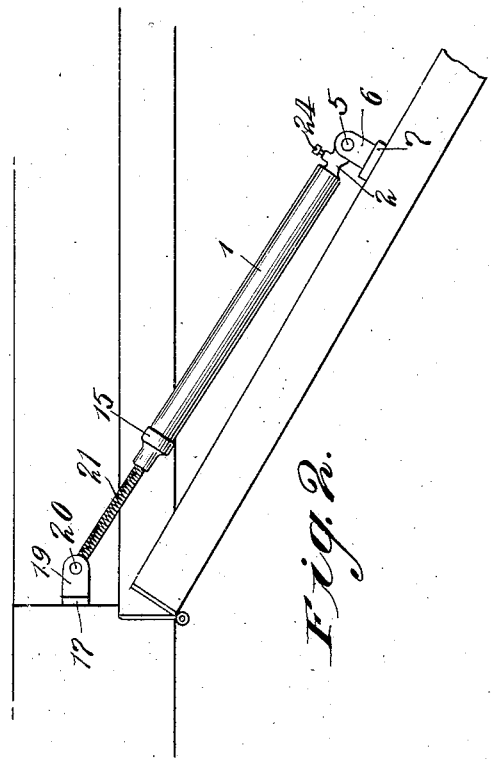
INVENTOR
Julius C. Lehmann
BY
William P. Hammond
ATTORNEY

UNITED STATES PATENT OFFICE.

JULIUS C. LEHMANN, OF BROOKLYN, NEW YORK.

DOOR-CHECK.

1,254,245.      Specification of Letters Patent.      Patented Jan. 22, 1918.

Application filed December 6, 1916. Serial No. 135,341.

*To all whom it may concern:*

Be it known that I, JULIUS C. LEHMANN, a citizen of the United States, residing in the city of New York, borough of Brooklyn, county of Kings, and State of New York, have invented certain new and useful Improvements in Door-Checks, of which the following, taken in connection with the accompanying sheet of drawings, is a full, clear, and concise description.

The present invention relates to door checks designed primarily for use in connection with screen doors and the like. It has for its object a simplification of the necessary or required parts which go to make up an efficient device of this character, thereby reducing the cost of manufacture and this without the sacrifice of efficiency in the mode of operation.

Referring to the accompanying drawings, in which I have illustrated one preferable embodiment of my invention, Figure 1 is a vertical, cross-sectional view of the device incorporating the principles of my invention. Fig. 2 is a perspective view thereof showing the application of said device to a screen-door.

Specifically the device comprises a cylindrical housing 1, one end of which is closed by a head 2, save for the exhaust passageway 3, which relieves the pressure from the device upon the closing of the door. The head 2 is provided with a bearing portion 4 apertured to receive the pin 5, the ends of which pin are mounted in the ears 6 of the base piece 7, which is fastened to the door, as shown in Fig. 2 by means of suitable screws received through the apertures 8. In this way, the tubular member 1 is swivelly connected to the door in order to take care of any angular variation of the device in use. Within the tubular member 1 is a piston head comprising a cup-shaped washer which is received upon a threaded stud 10 between two washer plates 11 and 12, the washer plate 11 being seated upon the base 13 of the stud 10. A retaining nut 14 is received upon the threaded stud 10 and clamps the washer plates 11 and 12 and the interposed cup-shaped piston washer 9 in operative relation. In screw-threaded engagement with the outer end of the casing 1 is a cap 15 and interposed between the plate 11 of the piston head and the cap 15 is a compression spring 16 normally under tension and urging the piston head into its retracted position as illustrated in Fig. 1.

In order to operatively connect the piston head with the door jamb, a base 17 is employed which is provided with screw-receiving apertures 18, suitable screws fasten the same to the door. This base 17 is provided with a pair of perforated ears 19, the perforations of which receive the pin or stud 20, to which is fastened at one end an expansion spring 21. The opposite end of this expansion spring is fastened to a stud 22, which is supported in the bifurcated end of the base 13. The tubular housing 1 is provided with a perforation or aperture 23 through which the air is admitted to the device. The exhaust aperture or passageway 3 is controlled by a set screw 24, which is slotted at 25 to provide a restricted passage-way for the air. By properly adjusting this set screw 24, the resistance to the passage of the air is regulated, thus controlling the operation of the device.

It will be observed that in use the spring 21 and housing 1 are telescopically related, the spring 21 being received entirely within the housing when the door is closed. As the door is being opened, the spring 21 expands while the spring 16 is compressed. While the former spring is being projected from the housing and carrying with it the piston head, air is admitted through the port 23, and flows past the washer 9 into the chamber formed between it and the head 2. This operation continues until the door has been fully opened. When the door has been released the stored energy of the spring 16 is immediately exerted upon the piston and urges it inwardly toward the head 2. The air which previously was admitted to the chamber above the piston acting upon the cup-like washer 9 expands it against the peripheral wall of the cylinder 1, thus trapping it and preventing the escape of the air there past but requiring it to exit through the passage-way 3. This passage-way being restricted to the desired extent by the set screw 4 the air escapes very slowly, thus preventing the piston from returning with sufficient rapidity to cause a slamming of the door.

One of the important features of my invention resides in the employment of a flexible connection between the piston and the door jamb connection. By the use of such a spring a smoother action in the operation of the device is obtained, as well as a greater range of relative movement between the fixed ends of the device; also, it will be obvious that when the expansion spring is under expansive tension, the return movement as the closing of the door proceeds is diminished. The return movement is, furthermore, retarded by the compressing action of the piston, the air being compressed within the device exerting a retardative effect upon the movement of the piston thus there is no sudden action which would cause a slamming of the door. It will be understood that during the opening movement of the door, as soon as the piston head passes the opening 23 and the tendency to partial vacuum in advance of the piston head is destroyed, the further movement of the door will not meet with the same degree of resistance, as when contending to overcome this resistance offered by this partial vacuum.

While I have illustrated in the accompanying drawings one preferred embodiment of the principles of my invention, I do this by way of example to show a useful application of the principles involved and I, therefore, do not wish to be limited thereto as changes may be resorted to without departing from the scope of the invention, as defined by the following claims.

Having thus described my invention, what I claim as new herein and desire to secure by Letters Patent is:

1. The combination with a door and door frame, of a door check including a cylindrical casing forming a dash-pot and having a head at one end thereof, a cap applied to the opposite end of the cylindrical casing and formed with a contracted neck, a piston member slidably mounted within the cylindrical casing and completely housed between the cap and head during the full limit of its movement, a compression spring arranged within the cylinder and engaging the piston member to resist the outward movement thereof, a tension spring connected to the piston and extending through the contracted neck of the cap, said contracted neck serving as a guide for the tension spring, means for securing the head end of the cylinder to one element of the closure, and means for securing the projecting end of the tension spring to the other element of the closure, said tension spring serving to yieldably draw the members of the closure together.

2. The combination with a door and door frame, of a door check including a cylindrical casing forming a dash-pot, a head applied to one end of the cylindrical casing, a cap applied to the opposite end of the cylindrical casing and formed with a central opening surrounded by an outwardly projecting neck, said cap providing an interior shoulder at the end of the cylindrical casing, a piston member slidably mounted within the cylindrical casing and completely confined between the cap and head during the full limit of its movement, a compression spring arranged within the cylinder and interposed between the shoulder provided by the cap and the piston, a coiled tension spring arranged within the compression spring and connected at one end thereof to the piston, the opposite end of the tension spring extending through the neck of a cap which serves as a guide for the tension spring, means for securing the head end of the cylinder to one element of the closure, and means for securing the projecting end of the tension spring to the other element of the closure, said tension spring serving to yieldably draw the members of the closure together.

JULIUS C. LEHMANN.